US012143036B1

(12) United States Patent
Petrenko et al.

(10) Patent No.: US 12,143,036 B1
(45) Date of Patent: Nov. 12, 2024

(54) PIEZOELECTRIC MOTOR USING LONGITUDINAL AND BENDING VIBRATION MODES

(71) Applicant: DJZ Holdings, LLC, Boca Raton, FL (US)

(72) Inventors: Sergii Petrenko, Kyiv (UA); Anatolii Omelian, Kyiv (UA); Valentin Zhelyaskov, Sarasota, FL (US); Mark Philip Broderick, Bradenton, FL (US)

(73) Assignee: DJZ Holdings, LLC, Boca Raton, FL (US)

( * ) Notice: Subject to any disclaimer, the term of this patent is extended or adjusted under 35 U.S.C. 154(b) by 0 days.

(21) Appl. No.: 18/626,032

(22) Filed: Apr. 3, 2024

(51) Int. Cl.
*H02N 2/10* (2006.01)

(52) U.S. Cl.
CPC .................... *H02N 2/103* (2013.01)

(58) Field of Classification Search
CPC ........................................................ H02N 2/103
See application file for complete search history.

(56) References Cited

U.S. PATENT DOCUMENTS

| | | | |
|---|---|---|---|
| 7,395,607 | B1 | 7/2008 | Broderick et al. |
| 7,876,022 | B2 | 1/2011 | Petrenko et al. |
| 8,183,740 | B2 | 5/2012 | Petrenko et al. |
| 8,183,741 | B2 | 5/2012 | Petrenko et al. |
| 8,183,742 | B2 | 5/2012 | Zhelyaskov et al. |
| 8,183,743 | B2 | 5/2012 | Petrenko et al. |
| 8,183,744 | B2 | 5/2012 | Petrenko et al. |
| 8,299,684 | B2 | 10/2012 | Petrenko et al. |
| 8,710,719 | B2 * | 4/2014 | Petrenko ........... H02N 2/026 310/369 |
| 8,979,065 | B2 | 3/2015 | Zhelyaskov et al. |
| 9,136,778 | B2 | 9/2015 | Petrenko et al. |
| 9,197,141 | B2 | 11/2015 | Petrenko et al. |
| 9,388,774 | B2 | 7/2016 | Zhelyaskov et al. |
| 9,705,425 | B2 | 7/2017 | Petrenko et al. |
| 10,819,251 | B2 | 10/2020 | Zhelyaskov et al. |

FOREIGN PATENT DOCUMENTS

| | | | | |
|---|---|---|---|---|
| CN | 101160711 | A * | 4/2008 | ......... H01L 41/0906 |
| CN | 105283676 | B | 7/2017 | |
| EP | 2374205 | B1 | 8/2015 | |
| EP | 3590185 | A1 | 1/2020 | |
| EP | 2961993 | B1 | 1/2021 | |
| EP | 2102921 | B1 | 6/2021 | |
| JP | 5722231 | B2 | 5/2015 | |

OTHER PUBLICATIONS

Machine translation of CN-101160711-A (Year: 2008).*

* cited by examiner

*Primary Examiner* — Emily P Pham
(74) *Attorney, Agent, or Firm* — Fenwick & West LLP (57) ABSTRACT

A piezoelectric device includes a piezoresonator body and a set of electrodes disposed on the piezoresonator body. The piezoresonator body includes a bulk region and a contact element integral with and protruding from the bulk region, and further includes opposing first and second surfaces. A pair of excitation electrodes are disposed on the first surface. A common electrode is disposed on the second surface. The piezoresonator body is characterized by a longitudinal axis and a transverse axis, and further characterized by a natural resonant frequency (v1) of first-order longitudinal standing vibrations along the transverse axis and a natural resonant frequency (v2) of second-order bending standing vibrations along the longitudinal axis, with $v1 < v2 \leq 1.1 v1$.

20 Claims, 7 Drawing Sheets
(6 of 7 Drawing Sheet(s) Filed in Color)

PIEZOELECTRIC MOTOR USING LONGITUDINAL AND BENDING VIBRATION MODES

BACKGROUND

1. Technical Field

This disclosure relates generally to piezoelectric motors.

2. Description of Related Art

In the process of miniaturizing standard electromagnetic electric motors, issues may emerge due to significant drops in efficiency, which may be the result of self-induction effects. When a motor's size is reduced to the millimeter scale "micromotors" (e.g., below 20 mm Outer Diameter (O.D.)), its efficiency may plummet significantly to just a few percent. This problem may not be encountered with piezoelectric ultrasonic motors which utilize the inverse piezoelectric effect to achieve motion through friction and bending. However, designing a miniature piezoelectric motor may be substantially more complex. This complexity may result in decreased reliability and/or inferior performance in aspects such as angular/linear resolution, output force/torque, and speed of motion.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

This present subject matter pertains to piezoelectric actuators and motors. Its application enables the design and development of small-scale (e.g., less than 20 mm outer diameter) piezoelectric actuators and motors capable of both linear and rotary motion. This class of miniature actuators/motors are especially suitable for use in various systems, including drone control, micro-robots, surgical tools, biological equipment, electronic and photonic devices.

A piezoelectric motor uses the inverse piezoelectric effect to produce motion. Voltages are applied across a body of piezoelectric material, for example a piezoceramic plate (piezoelectric resonator). This electrical excitation deforms the piezoceramic material. A separate part, sometimes referred to as the pusher or contact site is attached to the piezoceramic plate. The pusher converts the deformation of the piezoelectric body to useful motion, via frictional force, that drives other elements of the motor (e.g., a rotor or linear carriage) that are in contact with the pusher.

One of the drawbacks of some piezoelectric motor designs is the loss of ultrasonic energy that occurs during the energy transfer from the piezoceramic plate to the pusher. This loss leads to reduced motor efficiency and is particularly evident in designs in which the pusher is attached to the plate using a bonding agent (e.g., adhesive), and is therefore not integral with the piezoceramic plate. In such a design, the piezoelectric resonator plate actively creates the primary vibrations, whereas the pusher being passive, only transmits these vibrations to the rotor in linear carriage without directly participating in the vibration generation.

Another drawback of some piezoelectric motor designs is that they use two pushers that are symmetrically positioned around the piezoelectric body. The symmetrical positioning of the two pushers imposes constraints on the motor's structural design. It necessitates the use of either two carriages or rotors, symmetrically opposed or a design where the piezoelectric resonator itself moves as the carriage or rotor. The latter increases complexity because of the need to ensure a uniform force of contact between pushers and stator and the mechanism of electrical connectivity. These limitations impose restrictions on the scalability of minimum dimensions.

Adopting a single pusher design allows for more diverse motor designs, especially in the design of miniature piezomotors. However, this can also lead to an asymmetrical stiff piezoelectric resonator, complicating the excitation of two independent orthogonal longitudinal vibrations. In such piezoelectric resonator designs, longitudinal vibrations along the length and width become interconnected.

Modeling and experimentation have identified geometric constraints for integrated piezoceramic resonators having a single pusher that is part of the piezoceramic plate. In larger motors with bigger piezoelectric resonators, the pusher's impact on vibrations is negligible if the area ratio (St/Sr) is less than 1%, where Sr is the resonator's first flat surface area, and St is the pusher's area surface. Such a piezoelectric resonator can be considered quasi-rectangular, capable of exciting two independent types of orthogonal longitudinal oscillations, thus functioning as a quasi-resonant motor. However, the motor's performance declines with a reduction in size. This occurs because the decrease in the carriage (or rotor) contact surface area with the decrease in pusher size leads to a decline in performance and reliability. One problem is a smaller pusher with a smaller contact surface is fragile and susceptible to mechanical stress, damage and wear and tear, all of which diminishes motor performance and lifetime.

To maintain reliability and efficiency in smaller sized piezoelectric motors, it may be useful for the pusher's surface area and volume relative to the resonator's surface area to be increased. However, the drawback of this is that the piezoelectric resonator may no longer act as a rectangular plate with independent longitudinal orthogonal oscillations. Instead, the two oscillations can become coupled, leading to a loss of motor performance, as the pushers now impose a greater influence over the resonator's more complex and interrelated vibrations.

This approach described in this disclosure may be used to reduce the size of the piezoelectric motor with a single pusher resonator while maintaining or enhancing its reliability and efficiency. This may be provided by creating an active monolithic piezoelectric resonator having a single contact element (or pusher), which completes nano-elliptical mechanical motion, due to the simultaneous excitation of two independent and different in physical essence, standing wave vibrations; namely, longitudinal vibration across the width and bending vibration along the length.

In some embodiments, a piezoresonator body includes a bulk region and a contact element. The piezoresonator body is characterized by a longitudinal axis and a transverse axis and further characterized by a natural resonant frequency (v1) of first-order longitudinal standing vibrations along the transverse axis and a natural resonant frequency (v2) of second-order bending standing vibrations along the longitudinal axis. The two frequencies v1 and v2 are close but not equal. For example, they may be offset by 2%, or 5% or 10%. v2 may be larger than v1, so that v1<v2≤1.02v1 or v1<v2≤1.05v1, or v1<v2≤1.1v1.

The piezoelectric device includes a set of electrodes disposed on the piezoresonator body. An alternating voltage of frequency v1 may be applied across the electrodes. This excites the first-order longitudinal standing vibrations, which in turn produces parametric excitation of the second-order bending standing vibrations. These different vibration modes together produce motion of the contact element.

The design of the piezoresonator body characterized by the longitudinal axis and a transverse axis combined with different natural resonant frequencies v1 and v2 of different (longitudinal vs bending) modes may provide several advantages. For example, parametric excitation may provide for more controllable and synchronized vibrations. For example, since v2 is excited as a result of v1, its motion may be inherently linked and coherent with v1. This may lead to more integrated movement patterns by the piezoresonator body, such as nano-elliptical mechanical motion. By controlling the initiation and characteristics of the second vibrational mode through the first, there may be a reduction in acoustic noise or mechanical seizure, which may contribute to the overall efficiency and life span of the piezoresonator body.

This type of excitation may also result in increased efficiency for smaller motors. For example, the contact element may be integral with the rest of the piezoresonator body, which increases efficiency of energy transfer. This design may also utilize a single pusher, rather than requiring two symmetric pushers. In addition, in other designs that use two longitudinal modes (rather than one longitudinal and one bending mode), the size of the contact element is limited in order to reduce unwanted cross-coupling between the modes. Those limitations on size of the pusher are relaxed when the motion is based on parametric excitation of the bending mode.

In some embodiments, the piezoresonator body may be monolithic with a shape of a bulk region (e.g., rectangular plate) and a contact element protruding from the bulk region. The piezoresonator body also has opposing first and second surfaces. A pair of excitation electrodes is disposed on the first surface. A common electrode is disposed on the second surface.

The integration of the contact element with the bulk region of the piezoresonator body provides many advantages over designs in which the contact element is attached (e.g., using adhesives) to the piezoelectric device's bulk region. In the latter designs, considerable ultrasonic energy is often lost, impairing motor efficiency. By contrast, an integrated design reduces these energy losses, which enhances the overall efficiency of the piezoelectric motor. Furthermore, this integrated structure provides the direct and efficient transfer of mechanical vibrations from the bulk region to the contact element, stemming from the inverse piezoelectric effect. This improvement may improve the motor's performance features, including torque, speed, resolution and lifetime.

The piezoelectric motor may also include a casing designed to fit over the bulk region. It may have a hole and the contact element protrudes through the hole and makes frictional contact with the actuator. The fit of the casing over the piezoresonator body may limit torsional vibration of the piezoresonator body. This feature may significantly reduce speed variations of the motor. The casing may be attached to the piezoresonator body at areas where movement is minimal within a vibrational cycle of the piezoresonator body.

The piezoresonator body may be characterized by first-order longitudinal standing vibrations, and the casing may be attached to the piezoresonator body at nodal points (nodes) of the first-order longitudinal standing vibrations. For example, these nodal points experience minimal displacement in the vibrational cycle. The casing may be attached to the piezoresonator body only at three points that experience substantially no displacement in first-order longitudinal standing vibrations.

Figure 1:
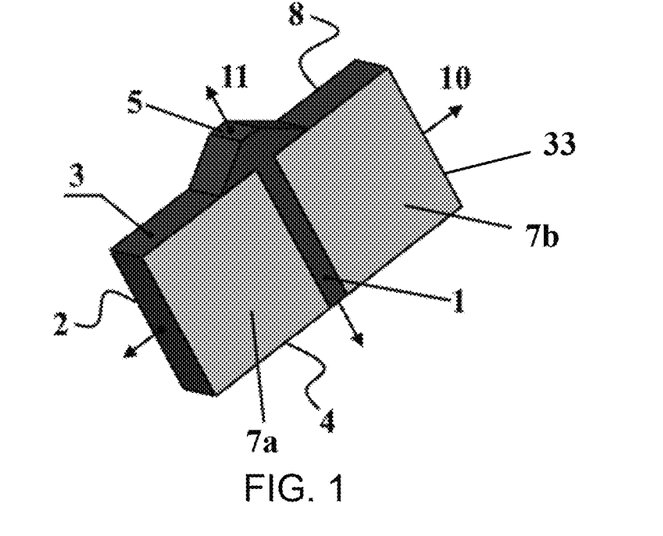
FIGS. 1-2 are perspective views of a piezoelectric resonator, in accordance with an embodiment.
Figure 2:
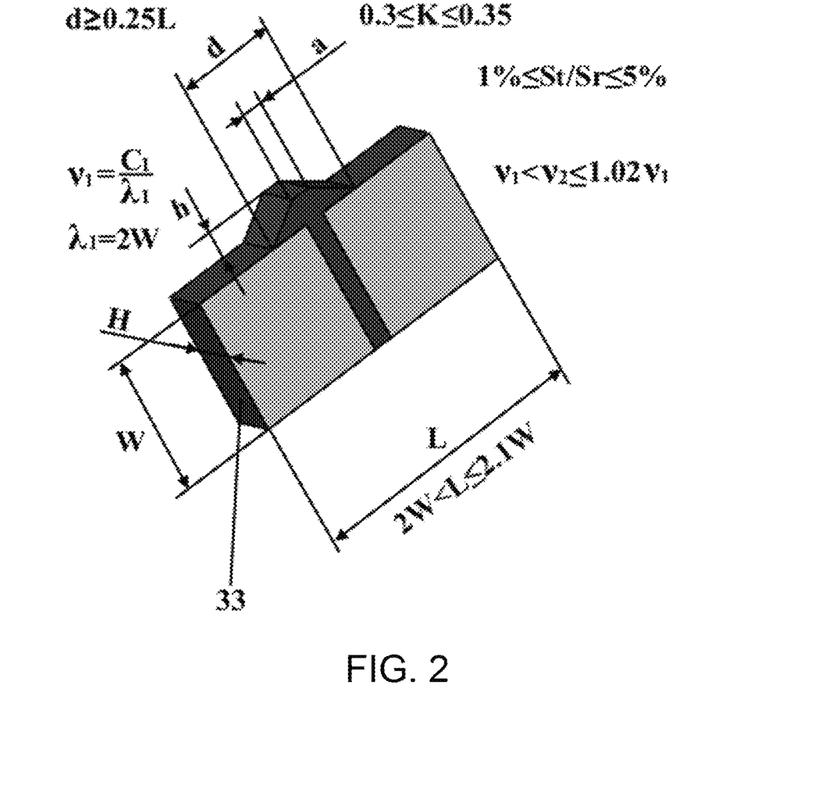

FIGS. 1 and 2 are perspective views of an exemplary piezoelectric quasi-resonance resonator (or piezoelectric device) configured to excite a first-order longitudinal standing vibrations (v1) along along its width (W) and a second-order standing bending vibrations (v2) along along its length (L).

The piezoelectric device of FIGS. 1-2 has a monolithic piezoresonator body in the shape of a bulk region 33 and a contact element (or pusher) 5. The contact element 5 is integral with the bulk region 33. The contact element 5 protrudes from the bulk region 33 and serves as a trapezoidal ultrasonic concentrator. The bulk region may be in the shape of a solid (e.g., rectangular plate). In this example, the bulk region 33 is a rectangular plate with a length L along a longitudinal axis 10, a width W along a transverse axis 11, and a thickness H. The bulk region 33 has opposing front and back surfaces 1,2. The front and back surfaces 1,2 of the plate are parallel to the longitudinal axis 10 and the transverse axis 11. The bulk region 33 also has opposing top and bottom surfaces 3,4. The top and bottom surfaces 3,4 are parallel to the longitudinal axis 10 and orthogonal to the transverse axis 11. A pair of excitation electrodes 7a, 7b are disposed on the front surface 1 and situated along the first longitudinal axis 10. A common electrode 8 is disposed on the back surface 2.

The location of the contact element 5 is at least partially aligned between the first and the second excitation electrodes 7a,7b. The piezoelectric resonator is polarized perpendicular to the first and second surfaces. The piezoelectric resonator has a natural resonant frequency of first-order longitudinal standing vibrations (v1) along the transverse axis 11 and a natural resonant frequency of second-order standing bending vibrations (v2) along the longitudinal axis 10, where $v_1<v_2\leq1.02v_1$, which is provided by a certain ratio of the geometric parameters of such a resonator as shown in FIG. 2.

The example resonator in FIGS. 1-2 is made according to specific geometric parameters, namely: W=5 mm, L=10.2 mm (where 2W<L≤2.1W), K=a/d=0.33, h=1 mm, a=1 mm, d=3 mm (where 0.3≤K≤0.35), (St/Sr)=4% (where 1%≤(St/Sr)≤5%).

Figure 3A:
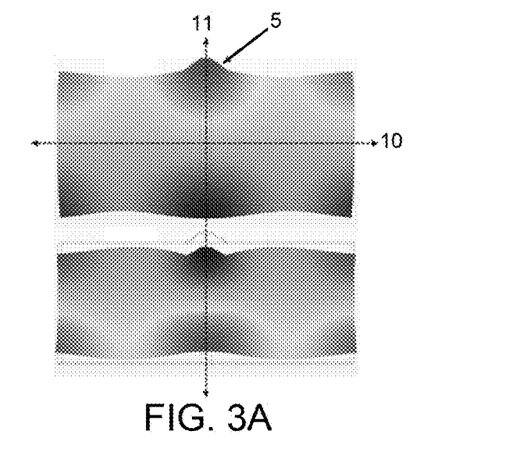
FIGS. 3A-C show different modes of vibrations in a piezoelectric resonator, in accordance with an embodiment.
Figure 3B:
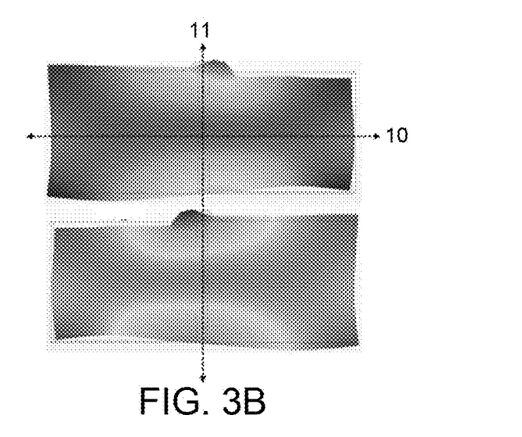
Figure 3C:
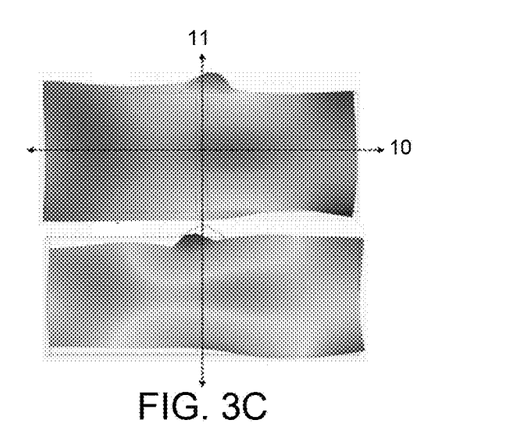

FIGS. 3A-C show the results of simulations of different modes of vibrations in a resonator with one contact element (one pusher). FIG. 3A shows the first-order longitudinal mode of vibrations along the width (transverse axis 11) of the resonator (frequency $v_1$). FIG. 3B shows the bending mode of vibrations along the length (longitudinal axis 10) of the resonator (frequency $v_2$). FIG. 3C shows the combination of simultaneous longitudinal mode and bending mode vibrations (frequency $v_3$). Each of these figures includes two images. The top image shows the resonator at one point in time and the bottom image shows the resonator at a different point in time. The colors represent the displacement of the resonator points at different phases and vibration modes. For example, each color may indicate the direction and/or value of the displacement. For example, red is one direction and blue is the opposite direction. The color distribution on an axis may have – and +. For FIG. 3A, the direction is along the transverse axis 11 because the motion of the resonator is mostly up and down. For FIG. 3B, the direction is along the longitudinal axis 10 because the motion of the resonator is mostly right and left. For FIG. 3C where the pusher motion is elliptical, the displacement shown is measured along the longitudinal axis 10.

Numerical simulations and experimental results, as illustrated in FIGS. 3A-C, reveal that in an asymmetrical resonator (relative to the longitudinal axis 10) with a single contact element (or pusher) 5 and polarized normally to the surface of the resonator (or piezoelectric device), certain geometric proportions enable the independent and simultaneous excitation of two distinct in physical essence vibrational modes. These proportions may be defined as follows:

$$2W<L\leq 2.1W \text{ (where } W=4\text{-}25 \text{ mm}, H=2\text{-}4 \text{ mm}, h=1\text{-}1.5 \text{ mm)} \text{ and } 1\%\leq (St/Sr)\leq 5\% \quad (1)$$

where:
- W is the width of the bulk region of the resonator (i.e., excluding the pusher);
- L is the length of the bulk region;
- H is the thickness of the resonator;
- h is the height of the pusher;
- $S_r$ is the area of the bulk region;
- $S_t$ is the area of the pusher.

Under these conditions, it may be feasible to simultaneously excite the first-order longitudinal vibrational mode along the width (see FIG. 3A, where the pusher oscillates along the transverse axis 11) and the vibrations akin to the second-order bending mode along the resonator's length (see FIG. 3B, where the pusher moves along the first longitudinal axis 10 with a slight rotational movement of the contact surface, relative to an axis perpendicular to the resonator's plane).

The frequency of the first-order longitudinal mode along the width is equal to:

$$v_1 = C_1/\lambda_1 = C_1/2W \quad (2)$$

where:
- $\lambda$ is the wavelength of the first-order longitudinal mode of vibrations, which is formed along the width W of the resonator; and
- $C_1$ is the velocity of propagation of longitudinal vibrations in a piezoelectric resonator.

The second-order bending mode frequency, denoted as v2, is linked to the first-order mode, v1. Its intensity is invariably less than half of that compared to v1. Given the specified range of geometric parameters for the resonator, the frequency range of v2 may be defined as follows:

$$v1 < v2 \leq 1.02 v1 \quad (3).$$

However, when these modes are simultaneously excited at an intermediary frequency, v3 (where v1<v3<v2), the motor may exhibit unstable performance, characterized by acoustics noise or mechanical seizure. This behavior suggested a non-ellipsoidal pattern in the movement of the contact point (pusher) and deviations from the required phase conditions.

Conversely, if the modes are excited at a frequency v3=v1 (noting that the amplitude of v1 is greater than that of v2), the motion of the contact site (pusher) tends towards an elliptical form as shown in FIG. 3C. There is a minor additional rotation of the contact surface. Under these conditions, the motor operates smoothly and with high efficiency. The amplitude of the pusher's vibrations is greater than 1.0 μm, aligning closely with the vibrational amplitude of a symmetrical resonator featuring two opposing contact sites (pushers).

This suggests a parametric excitation of mode v2 by mode v1, with the phase matching condition being met when v1<v2≤1.02*v1.

To increase the amplitude of the pusher vibrations and improve motor efficiency, the contact element has been further designed as a concentrator of ultrasonic vibrations.

In adherence to mechanical reliability requirements, the pusher was modelled as a trapezoid in the numerical simulations. The pusher's height, h, was set within a range of 1 mm to 1.5 mm. The pusher's dimensions were defined using the ratio K=a/d, where 'a' represents the length of the pusher's tip (upper base) and 'd' is the length of its lower base. Furthermore, the length of the pusher's lower base was determined to be at least 0.25 times the length L (d≥0.25*L).

Subsequent to the simulation and additional experimental validation to confirm the simulation's accuracy, it was established that an effective configuration for the pusher is a trapezoidal shape with a ratio of 0.3≤K≤0.35. Employing this particular design for the pusher/concentrator resulted in an increase of the pusher vibration amplitude by a factor of 3 to 5 times (i.e., 3 μm to 5 μm).

Figure 4:
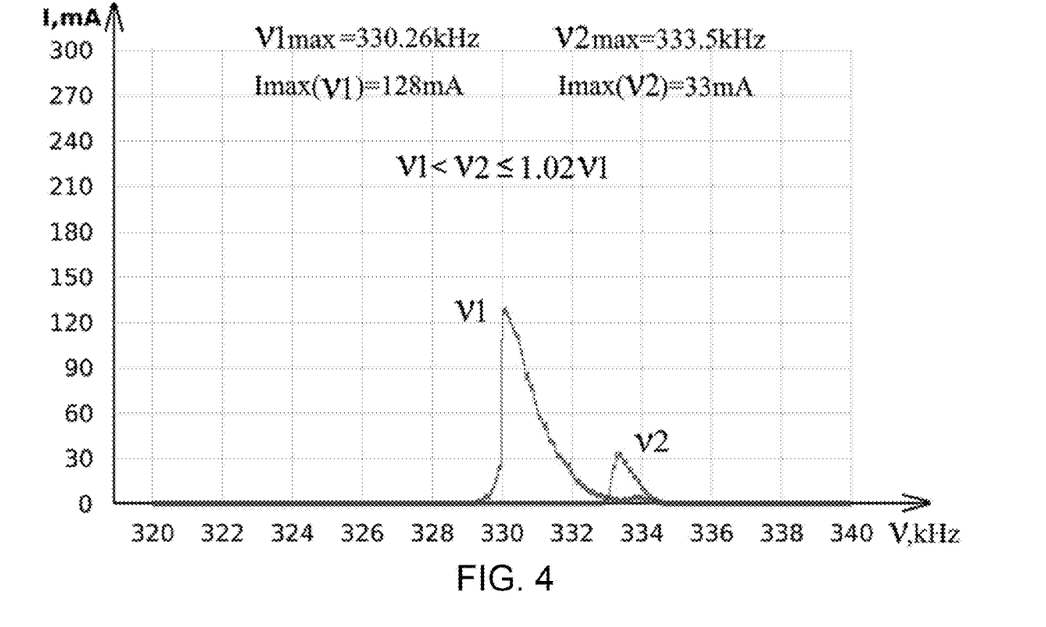
FIG. 4 are graphs of the experimental frequency response of a piezoelectric resonator, in accordance with an embodiment.

FIG. 4 shows the experimental frequency response of the resonator of FIGS. 1-2. In this case, the frequency of the first-order longitudinal mode along the width is $v_1$=330.26 kHz, and the frequency of the second-order bending mode along the length is $v_2$=333.5 kHz ($v_1 < v_2 \leq 1.02 v_1$). The current (I) intensity of the longitudinal mode resonance is 128 mA, and the intensity of the bending mode resonance is 33 mA. With excitation at frequency $v_1$ and excitation power P=1.5 Watts, the amplitude of the pusher vibrations reached 8 μm, which corresponded to motor carriage speed of 0.5 m/s.

Figure 5A:
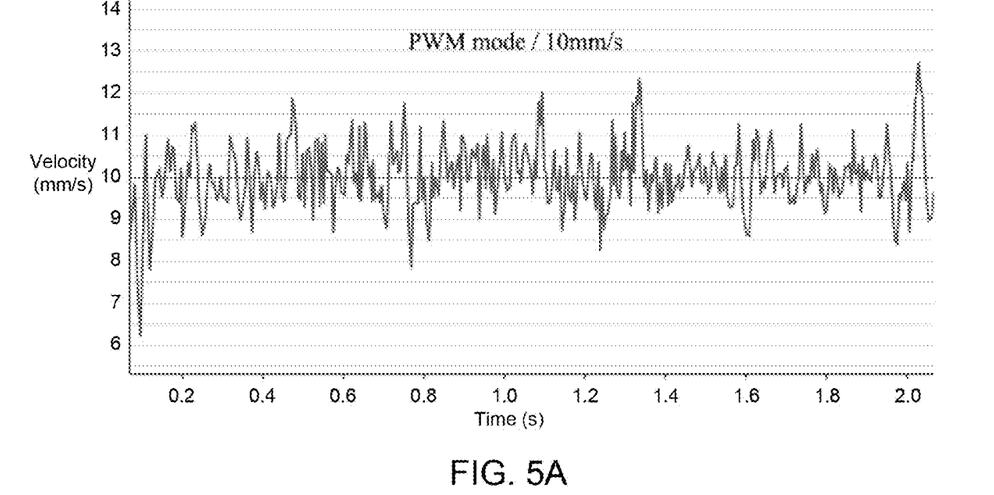
FIGS. 5A-B are graphs of experimental velocity variations of a piezoelectric motor, in accordance with an embodiment.

However, with a further increase in the excitation power P (P≥2 Watts) to increase of the force (torque) and/or speed of the motor, the irregularity in motion due to the velocity variations (ripple) during movement increased as well, as shown in FIG. 5A. For example, at an average speed of 10 mm/s in PWM mode, the variations in speed reached more than 25%.

As was established experimentally, variations in the speed (a similar picture for force variations) were a consequence of a significant turn (large torsional oscillations) of the contact element of the resonator, which led to stalling of the movement of the motor carriage during movement.

Figure 6:
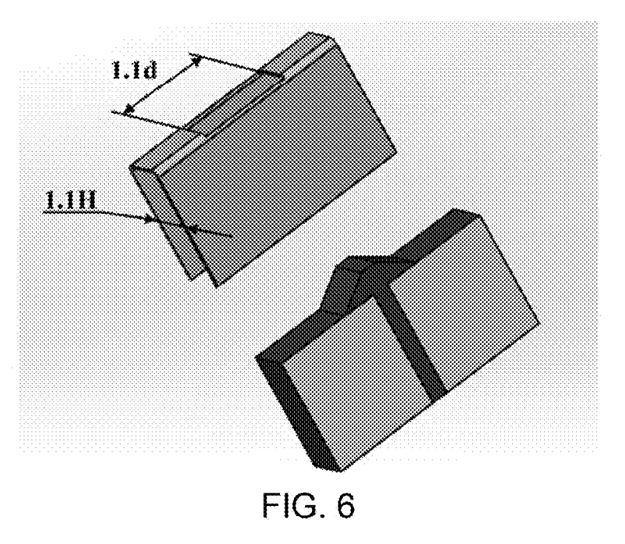
FIG. 6 is a schematic representation of an elastic U-shaped casing, in accordance with an embodiment.

To mitigate this detrimental effect, a U-shaped, acoustically compensating casing was implemented on the resonator, partially encompassing it. This casing was fabricated from a thin elastic material, such as plastic, with a thickness ranging between 0.05 to 0.15 mm. It featured an upper slot specifically designed for the resonator's contact element, as shown in FIG. 6. The dimensions of the casing were designed to not surpass the resonator's length and height, and its internal width was kept within 1.1 times the thickness of the resonator (H). This casing effectively reduced the torsional component of the contact element vibrations.

The attenuation of the torsional vibrations was achieved by a specially designed acoustically tight attachment of the casing to the piezoelectric element. This attachment was strategically placed at three points corresponding to the nodes of minimum vibrational velocity in the main longitudinal vibrational mode v1, as depicted in FIGS. 7A-B.

The installed casing effectively suppressed the torsional vibrations around the 0-01 axis, owing to its inherent stiffness, while preserving the integrity of the primary longitudinal vibrational mode v1, which is primary and which parametrically excites the v2 mode.

Figure 7A:
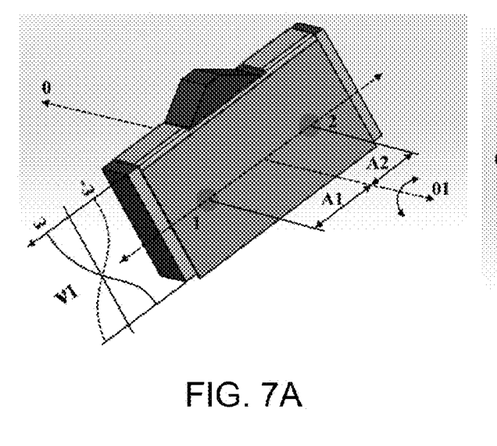
FIGS. 7A-B are schematic representations of a resonator with a torsional vibration compensator, in accordance with an embodiment.
Figure 7B:
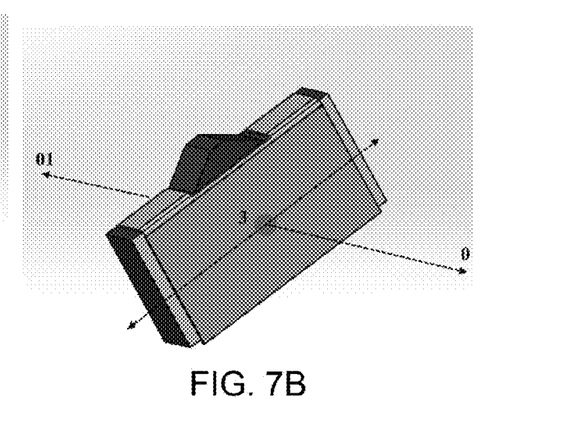

This suppression was accomplished by the elastic-rigid radial connection of points 1 and 2 (as shown in FIG. 7A) in relation to point 3 (depicted in FIG. 7B), situated on the rotational axis 0-01. The rotational arms A1 and A2 are defined in relation to this 0-01 axis. Consequently, the torsional vibrations occurring around the 0-01 axis in the resonator were significantly reduced by the casing's torsional stiffness. This the result of the counter-balancing attachments of points 1 and 2 in respect to point 3 on the 0-01 rotational axis.

Figure 8A:
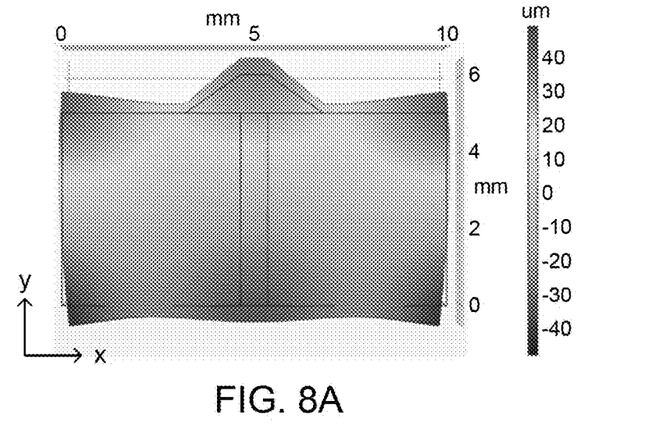
FIGS. 8A-C show different vibrational modes of the resonator, in accordance with an embodiment.
Figure 8B:
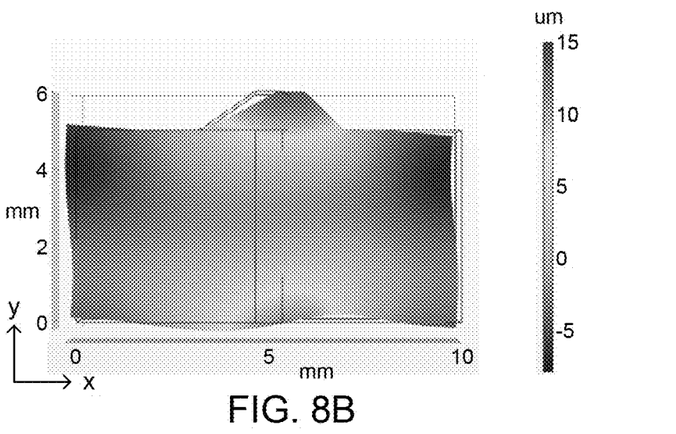
Figure 8C:
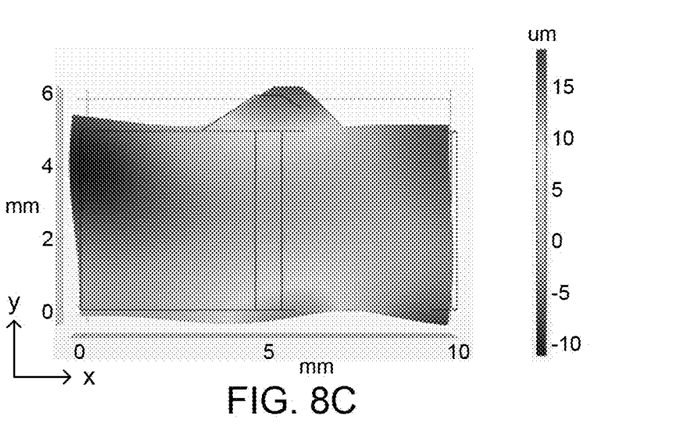

The numerical simulation of various vibration modes conducted on the resonator, now equipped with the compensatory casing (illustrated in FIGS. 8A-C), demonstrated notable outcomes. FIGS. 8A-C show the same modes as FIGS. 3A-C. FIG. 8A shows the longitudinal mode of vibrations along the width (with $v_1$=326.2 kHz), FIG. 8B shows the bending mode of vibrations along the length (with $v_2$=327.3 kHz), and FIG. 8C shows the combination of these modes (with $v_3$=326.8 kHz). In FIGS. 8A-C, the colors represent the displacement of the resonator points at different phases and vibration modes. Each color may indicate the direction and/or value of the displacement. For example, red is one direction, and blue is the opposite direction. The color distribution on an axis may have – and +. The color map in FIG. 8A shows the y component of the surface displacement field (in um), FIG. 8B shows the x component, and FIG. 8C also shows the x component. At an elevated excitation power of P=3 Watts, there was a proportional increase in the amplitude of the contact element's vibrations, reaching approximately 15 μm (as seen in FIG. 8C). This corresponded to a maximum motor speed of around 1 m/s. Importantly, these simulations showed an almost complete elimination of the contact element's torsional vibrations (as illustrated in FIGS. 8B and 8C). These results were subsequently validated through experimental testing.

Figure 5B:
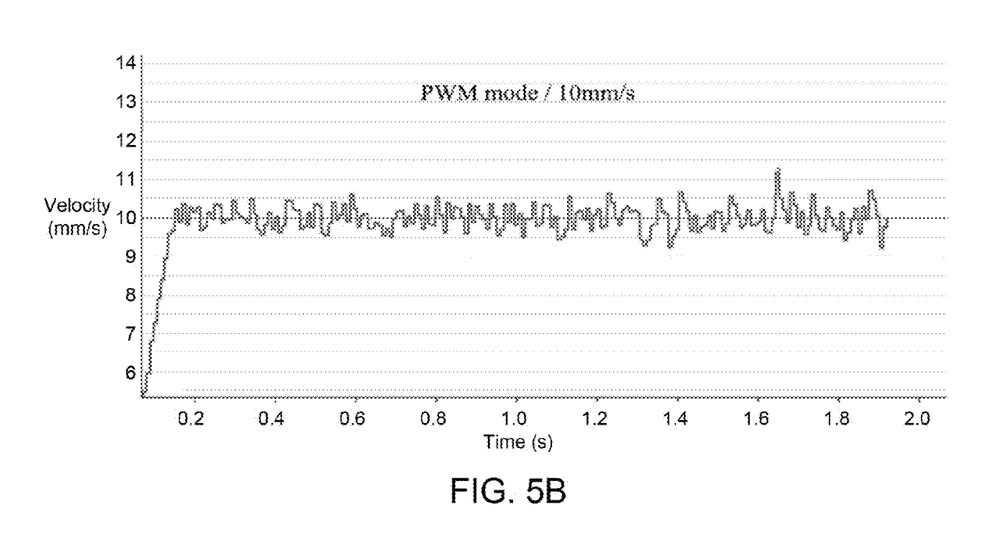

FIG. 5B presents data on the velocity fluctuation of a motor equipped with the compensating casing. This casing effectively reduced the velocity variation by approximately 2.5 times, bringing it down to 10% of the standard speed, which is 10 mm/s in Pulse-Width Modulation (PWM) mode, particularly at an increased excitation power of P=3 Watts.

Figure 9:
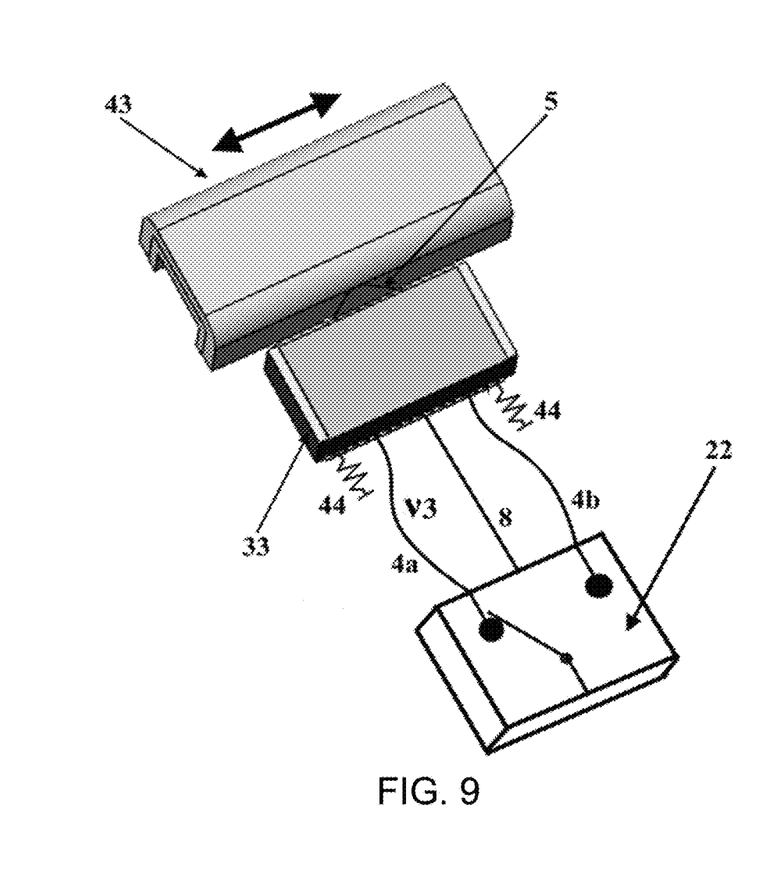
FIGS. 9 and 10 are schematic representations of piezoelectric motors, in accordance with embodiments.

The proposed piezoelectric motor may work as shown in FIG. 9. When an alternating voltage source 22 with a frequency of $v_3$=$v_1$ is connected to the common electrode 8 of the resonator 33 and one of the specified pair of excitation electrodes, e.g., 4a, the first-order longitudinal mode of vibrations along the width of the resonator is excited in the resonator and the second-order bending mode along the length of the resonator is parametrically excited. The superposition of these two orthogonal vibrations creates nano-elliptical motion of the contact element 5. The nano-elliptical motion is in a plane parallel to the first and second surfaces of the resonator. This nano-elliptical motion may have small additional torsional vibrations around an axis perpendicular to the first and second surfaces. The transferring of these vibrations via frictional force onto a linear carriage 43 creates a directional motion of the carriage, in this case to the right. The frictional connection between the piezoelectric resonator pusher and the carriage is ensured by using springs 44. Excitation of the resonator through electrode 4b results in reverse (to the left) motion.

Figure 10:
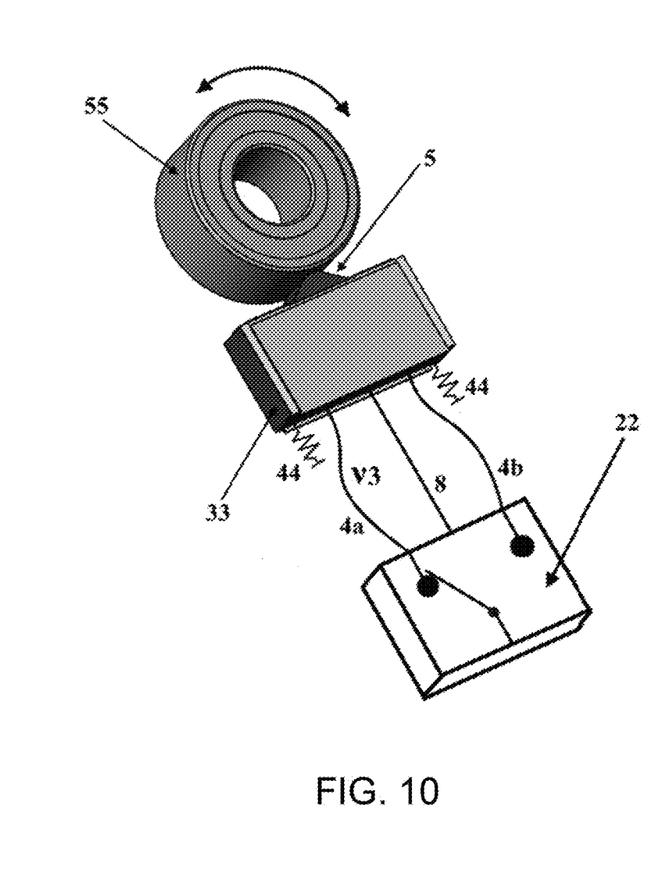

A similar design can be used for a rotary motor as shown in FIG. 10, where instead of a linear carriage 43, a rotor-bearing 55 is installed.

The technical solution introduced enables the following advancements. First, the present subject matter teaches a compact, functional miniature piezoelectric motor with a single pusher, whose dimensions are within the millimeter range. This is achieved by simultaneously exciting both longitudinal and bending vibrational modes within a specific frequency spectrum. Second, the present subject matter teaches enhancement of the motor's efficiency, including its speed and force, is facilitated by designing the contact element as a concentrator of ultrasonic mechanical vibrations. Third, the present subject matter teaches improvement in efficiency and reduction in velocity fluctuations at higher excitation powers are achieved by adding a specialized compensating casing to the resonator. This casing is tailored to counteract the torsional vibrations at the contact point. Fourth, the present subject matter teaches that increased reliability of the motor may be achieved through the trapezoidal design of the concentrator and by enlarging the contact element's area relative to the resonator's area.

What is claimed is:

1. A piezoelectric device comprising:
   a piezoresonator body comprising a contact element; wherein the piezoresonator body comprises a longitudinal axis, a transverse axis, a natural resonant frequency (v1) of first-order longitudinal standing vibrations along the transverse axis and a natural resonant frequency (v2) of second-order bending standing vibrations along the longitudinal axis, and v1<v2≤1.1v1; the piezoresonator body further comprising opposing first and second surfaces;
   a pair of excitation electrodes disposed on the first surface; and
   a common electrode disposed on the second surface.

2. The piezoelectric device of claim 1, wherein applying alternating voltage to the excitation electrodes causes piezoelectric vibration of the piezoresonator body, producing motion of the contact element.

3. The piezoelectric device of claim 1, wherein the contact element is made in a form of an ultrasonic vibration concentrator.

4. The piezoelectric device of claim 1, wherein the contact element is integral with a bulk of the piezoresonator body.

5. The piezoelectric device of claim 1, wherein the contact element has an area (St) and a bulk of the piezoresonator body has an area (Sr), and 1%≤(St/Sr)≤5%.

6. The piezoelectric device of claim 1, wherein the opposing first and second surfaces are substantially rectangular with length (L) and width (W), and 2W<L≤2.1W.

7. The piezoelectric device of claim 1, wherein v1<v2≤1.02v1.

8. The piezoelectric device of claim 1, wherein the piezoresonator body has an outer diameter of not more than 20 mm.

9. A piezoelectric device comprising:
a piezoresonator body comprising a contact element; wherein the piezoresonator body comprises a longitudinal axis, a transverse axis, a natural resonant frequency (v1) of first-order longitudinal standing vibrations along the transverse axis and a natural resonant frequency (v2) of second-order bending standing vibrations along the longitudinal axis, with v1≠v2; and
a set of electrodes disposed on the piezoresonator body, wherein applying alternating voltage to the set of electrodes excites the first-order longitudinal standing vibrations, which produces parametric excitation of the second-order bending standing vibrations, thereby producing motion of the contact element.

10. The piezoelectric device of claim 9, wherein the alternating voltage source has a frequency equal to v1.

11. The piezoelectric device of claim 9, wherein piezoresonator body includes a substantially rectangular ceramic plate with opposing first and second surfaces of length (L) and width (W), and 2W<L≤2.1W.

12. The piezoelectric device of claim 9, wherein the contact element has a substantially trapezoidal shape of area (St), a bulk of the piezoresonator body has an area (Sr), and 1%≤(St/Sr)≤5%.

13. The piezoelectric device of claim 9, wherein the motion of the contact element is an elliptical motion.

14. The piezoelectric device of claim 9, wherein:

$v1<v2\leq1.02v1$;

the contact element is integral with a bulk of the piezoresonator body;
the contact element has a substantially trapezoidal shape of area (St) and the bulk of the piezoresonator body has an area (Sr), and 1%≤(St/Sr)≤5%;
the piezoresonator body has opposing first and second surfaces that are substantially rectangular with length (L) and width (W), and 2W<L≤2.1W; and
the set of electrodes comprise a pair of excitation electrodes disposed on the first surface, and a common electrode disposed on the second surface.

15. A piezoelectric motor comprising:
a single moving element; and
a piezoelectric device comprising:
a piezoresonator body comprising a bulk region and a contact element that makes frictional contact with the moving element; wherein the piezoresonator body comprises a longitudinal axis, a transverse axis, a natural resonant frequency (v1) of first-order longitudinal standing vibrations along the transverse axis and a natural resonant frequency (v2) of second-order bending standing vibrations along the longitudinal axis, and v1<v2≤1.1v1; and
a set of electrodes disposed on the piezoresonator body.

16. The piezoelectric motor of claim 15, further comprising:
a casing that fits over the bulk region, wherein the casing has a hole and the contact element protrudes through the hole and makes frictional contact with the moving element.

17. The piezoelectric motor of claim 16, wherein the fit of the casing over the piezoresonator body limits a torsional vibration of the piezoresonator body.

18. The piezoelectric motor of claim 16, wherein the casing is attached to the piezoresonator body at nodal points of the first-order longitudinal standing vibrations.

19. The piezoelectric motor of claim 16, wherein:
the bulk region is a substantially rectangular ceramic plate with opposing first and second surfaces;
the set of electrodes comprises a pair of excitation electrodes disposed along the length of the first surface and a common electrode disposed on the second surface;
the contact element protrudes from a top of the bulk region; and
the casing covers the top of the bulk region and extends down along the first and second surfaces.

20. The piezoelectric motor of claim 16, wherein the casing covers the electrodes and provides electrical contact from a power source to the electrodes for excitation of the piezoelectric device.

* * * * *